United States Patent
Park

(10) Patent No.: US 9,088,038 B2
(45) Date of Patent: Jul. 21, 2015

(54) CONNECTION TAB FOR CONNECTING BATTERY CELLS AND BATTERY MODULE USING THE SAME

(75) Inventor: Han-Kyu Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 251 days.

(21) Appl. No.: 12/895,701

(22) Filed: Sep. 30, 2010

(65) Prior Publication Data

US 2011/0117412 A1 May 19, 2011

(30) Foreign Application Priority Data

Nov. 18, 2009 (KR) .................. 10-2009-0111400

(51) Int. Cl.
*H01M 2/20* (2006.01)

(52) U.S. Cl.
CPC .............. *H01M 2/202* (2013.01); *H01M 2/204* (2013.01); *H01M 2/206* (2013.01)

(58) Field of Classification Search
USPC ........... 429/149, 158, 159, 160, 151, 211, 99, 429/100, 121
See application file for complete search history.

(56) References Cited

U.S. PATENT DOCUMENTS

| | | | |
|---|---|---|---|
| 4,431,715 A | 2/1984 | Isenberg | |
| 6,365,297 B1 | 4/2002 | Wolczak et al. | |
| 2007/0065715 A1 | 3/2007 | Kim | |
| 2007/0126394 A1 | 6/2007 | Kim et al. | |
| 2011/0262777 A1 | 10/2011 | Choi et al. | |

FOREIGN PATENT DOCUMENTS

| | | | |
|---|---|---|---|
| CN | 101395737 A | 3/2009 | |
| DE | 100 62 256 A1 | 7/2001 | |
| DE | 10 2006 005 544 A1 | 8/2007 | |
| DE | 10 2007 000 504 A1 | 4/2009 | |
| FR | 1.188.709 | 9/1959 | |
| JP | 10-308205 A | 11/1998 | |
| JP | 2001-155702 * | 6/2001 | .............. H01M 2/10 |
| JP | 2004-158425 A | 6/2004 | |
| JP | 2005-011629 A | 1/2005 | |
| JP | 2006-080076 | 3/2006 | |
| JP | 2007-87944 A | 4/2007 | |
| JP | 2007-265855 | 10/2007 | |

(Continued)

OTHER PUBLICATIONS

European Search Report dated Mar. 14, 2011, for corresponding European Patent application 10191643.5, noting listed references in this IDS.

KIPO Notice of Allowance dated Nov. 30, 2011, for Korean priority Patent application 10-2009-0111400, noting references previously submitted in an IDS dated May 18, 2011, 1 page.

(Continued)

*Primary Examiner* — Raymond Alejandro
(74) *Attorney, Agent, or Firm* — Christie, Parker & Hale LLP

(57) ABSTRACT

A connecting tab for connecting battery cells that can prevent interference caused by contact between a housing and the connecting tab when inserting a battery module into the housing. The connecting tab includes a hole formed in a center portion thereof. There connecting tab connects the battery cells, including: a main body part formed in a plate shape; a cell bonding part in the main body that contacts the plurality of battery cells; a hole that is formed in a central portion surrounded by the cell bonding part; and a bending part that crosses the hole and is folded to be overlapped in half. With this configuration of the connecting tab, stability of the battery module can be improved.

11 Claims, 4 Drawing Sheets

(56) References Cited

FOREIGN PATENT DOCUMENTS

| | | |
|---|---|---|
| JP | 2008-270350 A | 11/2008 |
| JP | 2009-517832 A | 4/2009 |
| JP | 2012-506108 A | 3/2012 |
| KR | 10-0889243 B1 | 3/2009 |

OTHER PUBLICATIONS

KIPO Office Action for KR 10-2009-0111400 dated Mar. 31, 2011, 3 pages.
EPO Office action dated Oct. 21, 2013, for corresponding European Patent application 10191643.5, (4 pages).
Japanese Office action for Patent Application No. 2010-016916, dated Nov. 12, 2013, 3 pages.

* cited by examiner

CONNECTION TAB FOR CONNECTING BATTERY CELLS AND BATTERY MODULE USING THE SAME

CROSS-REFERENCE TO RELATED APPLICATION

This application claims the benefit of Korean Patent Application No. 10-2009-0111400, filed on Nov. 18, 2009, in the Korean Intellectual Property Office, the disclosure of which is incorporated herein by reference.

BACKGROUND

1. Field

An embodiment of the present invention relates to a connection tab for connecting battery cells and a battery module using the same, and more particularly, to a connecting tab for connecting battery cells that can improve stability when inserting a battery module into a housing and a battery module using the same.

2. Description of the Related Art

Generally, a secondary battery, which is a battery that can be charged and discharged differently from a primary battery that cannot be charged, may be sorted into a low capacity secondary battery (hereinafter, referred to as a "battery cell") that is used by packaging one or a plurality of secondary batteries in a pack, and a large capacity secondary battery (hereinafter, referred to as a "battery module") for driving a motor in a battery pack unit that collects and uses several tens of battery cells, based on the usage or the battery capacity thereof In the battery module consisting of a plurality of circular battery cells, the battery module is configured by resistively welding each neighboring battery cell and connecting tabs using the connecting tabs.

When the battery module is configured of a plurality of battery packs, the respective battery packs may also be connected to themselves by electrically connecting them using the connecting tabs and then by bending the connecting tabs. Such a battery module has a housing that surrounds the outside.

The battery module and the housing are coupled by inserting the battery module into the housing from one side of the battery module to the other side thereof, and at this time, the bent portions of the connecting tabs that connect the respective battery packs come into contact with the housing and generate interference, thereby creating a problem where stability of the battery module deteriorates.

SUMMARY

Therefore, an embodiment of the present invention provides a connecting tab for connecting battery cells that can prevent interference due to contact between a housing and the connecting tab when inserting a battery module into the housing. The interference is prevented by, amongst other features, forming a hole in one region of the connecting tab that electrically connects the battery module configured in a pack unit, and a battery module using the same.

Another embodiment of the present invention provides a connecting tab for connecting battery cells to form a battery module. The connecting tab can be bent at a bending groove formed in the connecting tab, thereby connecting the battery cells and forming the battery module.

According to one embodiment of the present invention, a connecting tab for connecting battery cells that connects a plurality of battery cells of a battery module includes: a main body part formed in a plate shape; a cell bonding part in the main body that contacts the plurality of battery cells; a hole that is formed in a central portion of the main body and is surrounded by the cell bonding part; and a bending part that crosses the hole and is folded in half.

According to another embodiment of the present invention, at least one bending groove may be formed in the bending part in a straight line.

According to another embodiment of the present invention, interference preventing grooves depressed inwardly to the main body part are respectively formed on both ends of the bending part.

According to another embodiment of the present invention, a welding part that bonds the battery cells may be further formed on the cell bonding part.

According to another embodiment of the present invention, a battery module that is configured in a battery pack unit in which a plurality of battery cells are connected to each other includes: a connecting tab that connects the battery packs and is bonded to partial battery cells of one battery pack and partial battery cells of the other battery pack, wherein the connecting tab has a hole in a region surrounded by some of the battery cells of one battery pack and some of the battery cells of the other battery pack.

According to another embodiment of the present invention, the connecting tab may further have a bending groove to connect the battery cells of the one battery pack with the cells of the other battery pack.

According to another embodiment of the present invention, the connecting tab may have a cell bonding part where the battery cell may be bonded.

According to another embodiment of the present invention, the connecting tab may further form a bending groove so that the one battery pack may be overlapped with the other battery pack by folding the bending groove.

According to another embodiment of the present invention, an insulation member may further be formed on the overlapped side between the one battery pack and the other battery pack.

According to another embodiment of the present invention, the insulation member may be smaller than the battery pack.

According to another embodiment of the present invention, the plurality of battery cells of the battery pack may be arranged in a shape where positive and negative terminals reciprocally alternate in one direction.

According to another embodiment of the present invention, the battery cell may have a cylindrical shape.

According to another embodiment of the present invention, the battery module may further include a housing that envelops the battery module.

According to another embodiment of the present invention, the housing may be formed in a shape complementary to the battery module.

According to another embodiment of the present invention, the battery module may be inserted into the housing from one side of the battery module to the other side thereof.

As described above, according to an embodiment of the present invention, the hole is formed in one region of the connecting tab that electrically connects the battery module configured in a pack unit so that interference due to contact between the housing and the connecting tab is prevented when inserting the battery module into the housing, making it possible to improve stability.

Moreover, according to another embodiment of the present invention, the bending groove is further formed in the connecting tab so that the connecting tab can be bent without being leaned to any one battery pack, making it possible to improve assembly dispersion as well as to secure reliability.

Additional aspects and/or advantages of the invention will be set forth in part in the description which follows and, in part, will be obvious from the description, or may be learned by practice of the invention.

BRIEF DESCRIPTION OF THE DRAWINGS

The accompanying drawings, together with the specification, illustrate exemplary embodiments of the present invention, and, together with the description, serve to explain the principles of the embodiments of the present invention. These and/or other aspects and advantages of the invention will become apparent and more readily appreciated from the following description of the embodiments, taken in conjunction with the accompanying drawings of which.

DETAILED DESCRIPTION

Figure 1:
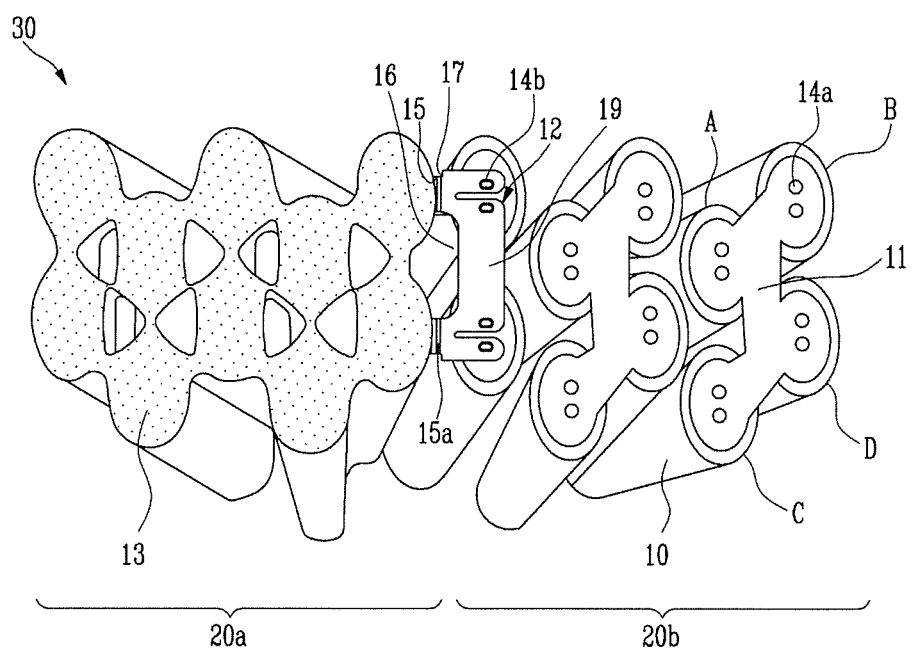
FIG. 1 is a perspective view showing a configuration of a secondary battery module according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter, a battery module according to an embodiment of the present invention will be described with reference to the accompanying drawings.

FIG. 1 is a perspective view showing a configuration of a secondary battery module according to an embodiment of the present invention. Before explaining the drawings, a connecting tab that connects battery packs 20a and 20b will be referred to as a first connecting tab 12, and a connecting tab that connects battery cells 10 will be referred to as a second connecting tab 11.

Referring to FIG. 1, the battery module 30 according to an embodiment of the present invention is configured in battery packs 20a and 20b where a plurality of cylindrical battery cells 10 are connected to each other, each battery packs 20a and 20b being connected by the first connecting tab 12. And, four battery cells 10 of the battery packs 20a and 20b configured of the plurality of battery cells 10 are connected to terminals (not shown) formed on each battery cell 10 by the second connecting tab 11. The second connecting tab 11 has welding parts 14a on regions contacting the respective battery cells so that the four battery cells 10 are connected in a diamond shape, thereby making it possible to be attached to the battery cell 10 by welding.

Although not shown in FIG. 1, since the second connecting tab 11 is formed in a structure where it makes the four battery cells 10 connect, the four connected battery cells 10 are arranged in a row and then the second connecting tab 11 is attached to the respective two battery cells 10 not connected on the upper surface in order to connect the four connected battery cells 10 on the lower surface of the battery cells 10. Thereby, the plurality of battery cells 10 are electrically connected, making it possible to configure one battery pack 20a and 20b (see FIG. 4).

In one of the embodiments of the present invention, the battery module 30 configured of two battery packs 20a and 20b is illustrated, wherein the first connecting tab 12 is formed in a plate shape that contacts two battery cells 10 of one battery pack 20a and two battery cells 10 of the other battery pack 20b. In the same manner as the second connecting tab 11, the first connecting tab 12 has welding parts 14b in cell bonding parts 18 (see FIG. 2) contacting the respective battery cells 10, making it possible to connect the battery packs 20a and 20b by welding. Such a first connecting tab 12 is formed to contact one battery pack 20a and the other battery pack 20b, having a hole 16 in the central portion thereof.

In the battery module 30 having two battery packs 20a and 20b connected by the first connecting tab 12 as described above, one region of the first connecting tab 12 is folded so that one battery pack 20a overlaps the other battery pack 20b. At this time, an insulation member 13 may be attached to the overlapped sides between one battery pack 20a and the other battery pack 20b. Herein, the insulating member 13 should be formed to be smaller than the battery packs 20a and 20b and may be formed of an insulation tape.

In the other battery pack 20b of FIG. 1, a battery cell A and a battery cell C, and a battery cell B and a battery cell D are connected in parallel, respectively, and the battery cell A and the battery B, and the battery C and the battery D, are connected in series, respectively. Therefore, an additional insulation member (not shown) may further be formed between the battery cell A and the battery cell B and between the battery cell C and the battery cell D.

In other words, in the present embodiment, the battery module 30 has a structure where the neighboring four battery cells 10 are connected to each other using the first connecting tab 12 and the second connecting tab 11. Furthermore, the polarities of the two battery cells 10 are arranged to be crossed so that the positive and negative terminals of the plurality of battery cells 10 reciprocally alternate in one direction. The battery module 30 connected by the first connecting tab 12 and the second connecting tab 11 is inserted into a housing 40 (see FIG. 5), wherein interference caused by the contact of the connecting tab 12 with the housing can be prevented by the hole 16 (see FIG. 2) formed in the center of the first connecting tab 12.

Figure 2:
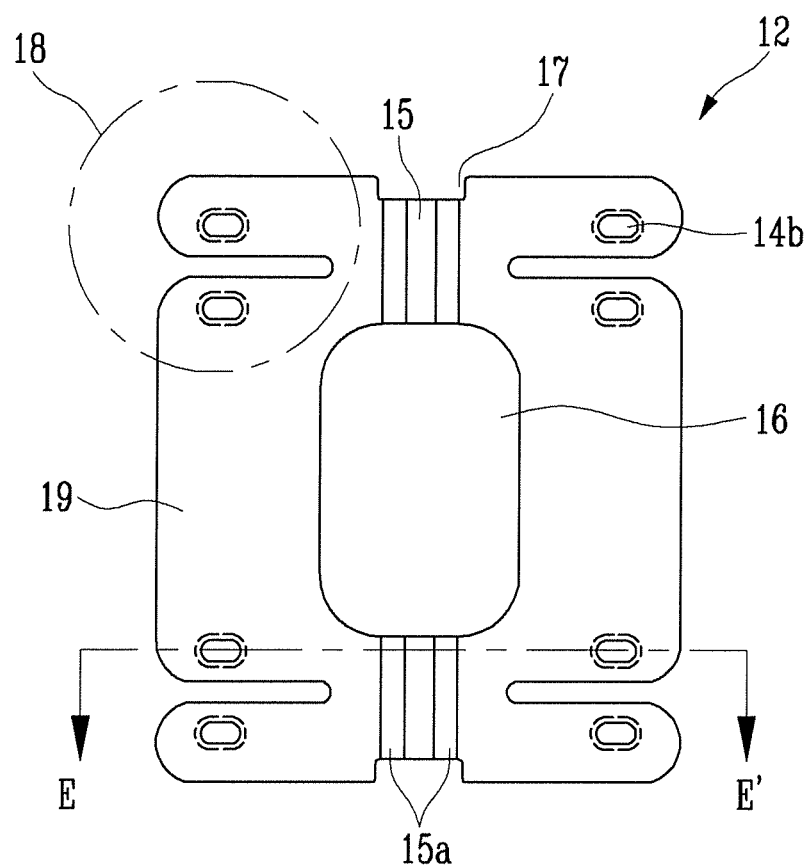
FIG. 2 is a plan view showing a first connecting tab according to another embodiment of the present invention.
Figure 3:
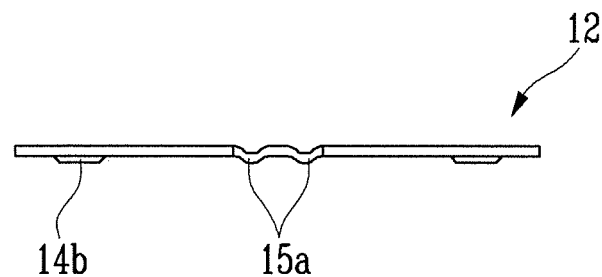
FIG. 3 is a cross-sectional view showing line E-E' of FIG. 2.

FIG. 2 is a plan view showing the first connecting tab according to an embodiment of the present invention, and FIG. 3 is a cross-sectional view showing line E-E' of FIG. 2.

Referring to FIGS. 2 and 3, the first connecting tab 12 is positioned to contact two battery cells 10 of one battery pack 20a (see FIG. 1) and two battery cells 10 of the other side battery pack 20b (see FIG. 1), thereby connecting the respective battery packs.

The first connecting tab 12 includes a main body part 19 in a plate shape, cell bonding parts 18 in the main body part 19 that contact the plurality of battery cells 10, and a bending part 15 that crosses a hole 16 formed in a central portion surrounded by the cell bonding parts 18 and is folded so that the first connecting tab 12 is overlapped in half.

The cell bonding parts 18 of the first connecting tab 12 have welding parts 14b formed to protrude to the sides of the battery cells 10. Interference preventing grooves 17 that are depressed inwardly to the main body part 19 may further be formed in both ends of the bending part 15. The first connecting tab 12 may have a rectangular or square shape and may further include indentations on each side separating two adjoining welding parts 14b.

In addition, the first connecting tab 12 is folded so that one battery pack is overlapped with the other battery pack, and two bending grooves 15a are formed in the bending part 15 formed between one battery pack and the other battery pack in a straight line so that the shapes of the first connecting tab 12 are symmetrical and is easily folded. Thereby, the bending grooves 15a of the first connecting tab 12 are folded, making it possible to make one battery pack and the other battery pack overlap exactly without being leaned in any one direction. Herein, two bending grooves 15a are formed on the first connecting tab 12 but the number of grooves is not limited thereto and the first connecting tab 12 may include more or less grooves.

Figure 4:
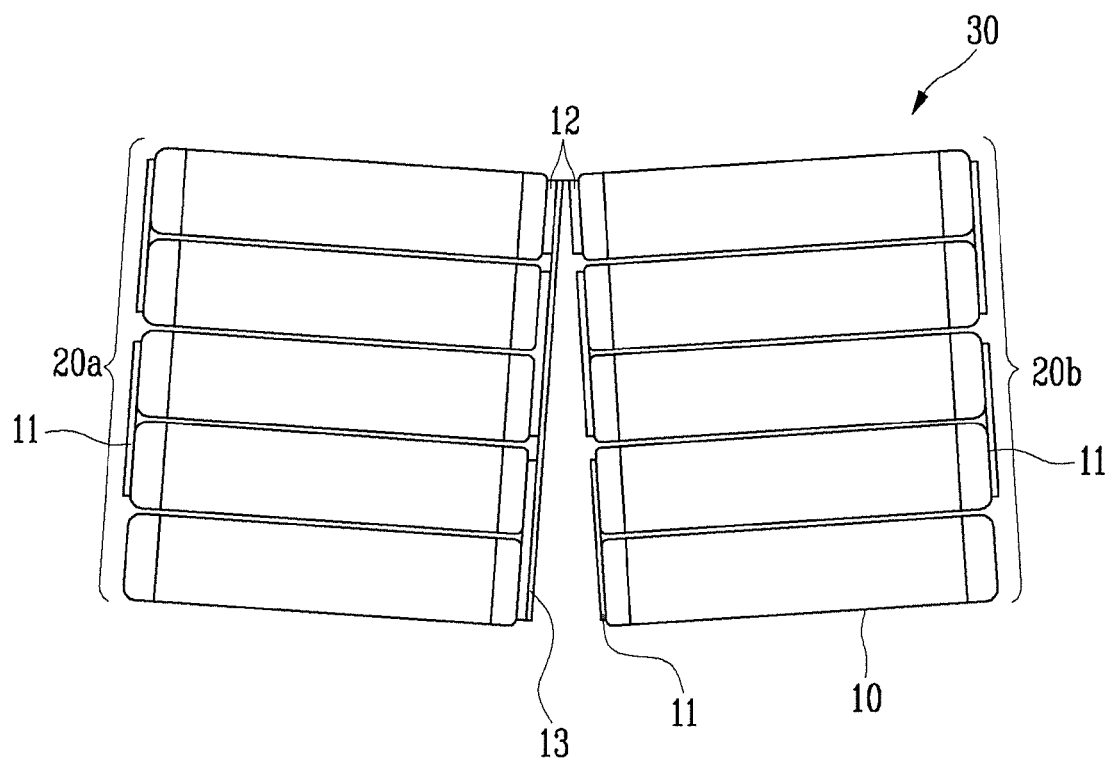
FIG. 4 is a perspective view showing a bent shape of the secondary battery module according to another embodiment of the present invention.

FIG. 4 is a perspective view showing a bent shape of the secondary battery module according to an embodiment of the present invention. Referring to FIG. 4, the first connecting tab 12 is folded along the bending part 15 (see FIG. 2) so that one battery pack 20a and the other battery pack 20b overlap so as to be exactly symmetrical to each other. Herein, the plurality of battery cells 10 that configure the battery packs 20a and 20b are formed in a cylindrical shape and are connected by the first connecting tab 12, thereby configuring the battery packs 20a and 20b. The first connecting tab 12 that connects such battery packs 20a and 20b has a hole 16 (see FIG. 2) in its central portion so that it is not exposed to the outside of the folded battery module 30. The insulation member 13 is attached to the overlapped portions between one battery pack 20a and the other battery pack 20b, thereby preventing electrical interference from one battery pack 20a and the other battery pack 20b. Such an insulation member 13 is formed to be identical or smaller than the battery packs 20a and 20b, thereby not being exposed outside of the battery module 30.

Figure 5:
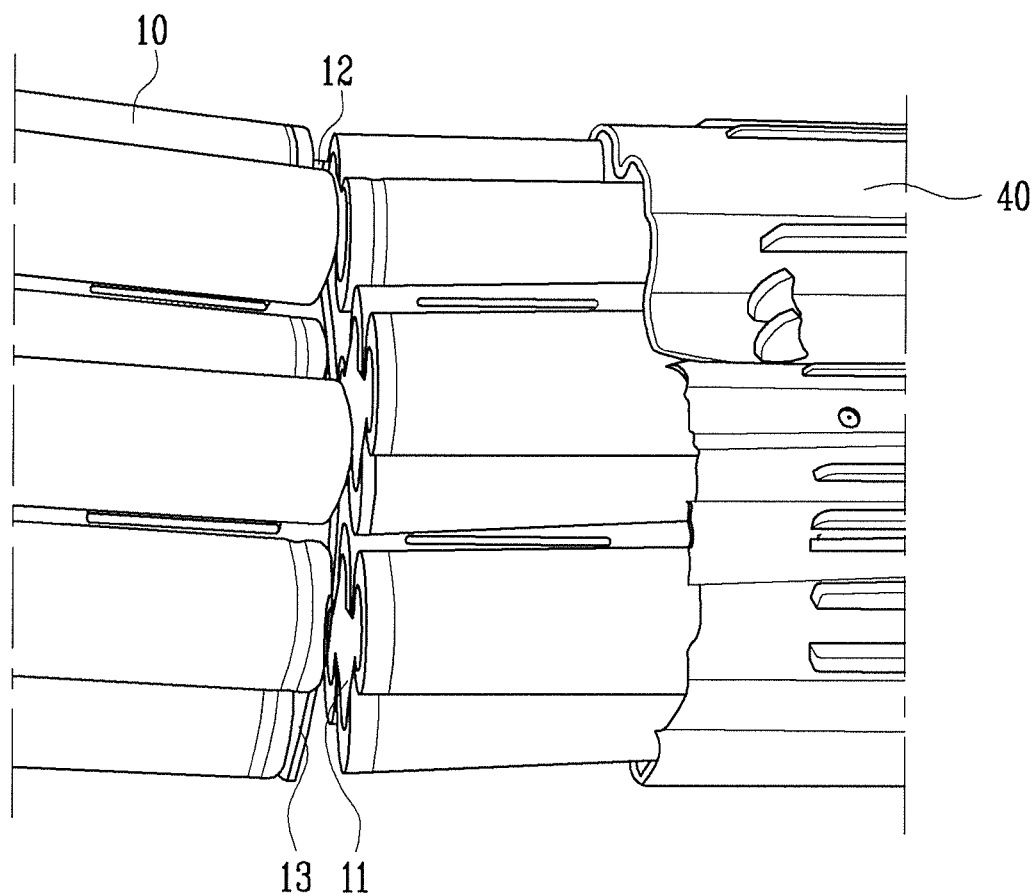
FIG. 5 is a perspective view showing the battery module inserted into a housing according to another embodiment of the present invention.

FIG. 5 is a perspective view showing a bent battery module according to the embodiment of the present invention once the battery is inserted into a housing. Referring to FIGS. 5 and 2, the battery module 30 is configured of one battery pack 20a and the other battery pack 20b overlapped at the first connecting tab 12. The first connecting tab 12 is folded along the bending grooves 15a and has the housing 40 that surrounds the outside of the battery module. The housing 40 has excellent mechanical characteristics and serves to discharge heat generated from the battery module to the outside. Furthermore, the housing 40 is sealed from the outside in order to prevent moisture from entering the battery module.

Additionally, the housing 40 is manufactured in a shape that complements the battery module, and the housing 40 is able to be coupled with the battery module by inserting the battery module into the housing 40 from one side of the battery module to the other side thereof. Since the hole 16 and the interference preventing grooves 17 are formed in the first connecting tab 12, the first connecting tab 12 is not exposed outside of the battery module, therefore interference due to contact between the housing 40 and the first connecting tab 12 is prevented when inserting the battery module into the housing 40, making it possible to improve stability.

Furthermore, as aforementioned, the first connecting tab 12 can be folded by the bending grooves 15a formed in the first connecting tab 12, making it possible to improve assembly dispersion as well as to secure reliability.

While the aspects of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof. Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery module comprising multiple battery pack units, each of the battery pack units comprising a plurality of battery cells connected to each other, the battery module further comprising:
    a first connecting tab that connects the multiple battery pack units, the first connecting tab comprising a first portion and a second portion, the first and second portions surrounding an opening at a central region of the first connecting tab, the first portion being bonded to the plurality of battery cells of a first battery pack unit from among the battery pack units, and the second portion being bonded to the plurality of battery cells of a second battery pack unit that is adjacent the first battery pack unit from among the battery pack units; and
    a second connecting tab connecting at least two adjacent battery cells of the plurality of battery cells of a respective one of the first or second battery pack units to each other, the second connecting tab having a different structure from the first connecting tab, and comprising at least two tabs coupled to respective ones of the adjacent battery cells of the plurality of battery cells and a connecting member at a central region that connects the at least two tabs to each other;
    wherein the first connecting tab has a bending groove configured to overlap the first battery pack unit with the second battery pack unit as the bending groove is folded along a folding axis such that the entire first connecting tab including the first portion and the second portion is enclosed within the folded battery module and the first connecting tab is between the first and second battery pack units of the folded battery module, and wherein the first connecting tab, the opening at the central region, and the bending groove are aligned with each other along a direction parallel to the folding.

2. The battery module as claimed in claim 1, wherein the first connecting tab further has a groove between the plurality of battery cells of the one battery pack unit and the plurality of battery cells of the second battery pack unit.

3. The battery module as claimed in claim 1, wherein the first connecting tab has a cell bonding part where the first connecting tab is bonded to one of the plurality of battery cells by welding the cell bonding part.

4. The battery module as claimed in claim 1, wherein the first connecting tab further forms a plurality of bending grooves so that the one battery pack unit is overlapped with the second battery pack unit as the plurality of bending grooves are folded.

5. The battery module as claimed in claim 1, wherein an insulation member is placed between the one battery pack unit and the second battery pack unit.

6. The battery module as claimed in claim 5, wherein a size of the insulation member is smaller than a size of one of the battery pack units.

7. The battery module as claimed in claim 1, wherein the plurality of battery cells of each battery pack unit are arranged in a shape where positive and negative terminals of each of the plurality of battery cells reciprocally alternate in one direction.

8. The battery module as claimed in claim 1, wherein each of the plurality of battery cells of each battery pack unit have a cylindrical shape.

9. The battery module as claimed in claim 1, wherein the battery module further includes a housing that surrounds the battery module.

10. The battery module as claimed in claim 9, wherein the housing is formed in a shape that is complementary to a shape of the battery module.

11. The battery module as claimed in claim 9, wherein the battery module further comprises a first side and a second side, wherein the battery module is inserted into the housing from the first side of the battery module to the second side thereof.

* * * * *